United States Patent
Gao et al.

(10) Patent No.: US 10,206,240 B2
(45) Date of Patent: Feb. 12, 2019

(54) METHOD FOR CONDUCTING INTERACTION ON INFORMATION IN ENVIRONMENT OF SMALL EVOLVED NODE B, EVOLVED NODE B, AND MOBILITY MANAGEMENT ENTITY

(71) Applicant: ZTE CORPORATION, Shenzhen, Guangdong Province (CN)

(72) Inventors: Yin Gao, Shenzhen (CN); Shuang Liang, Shenzhen (CN); Feng He, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 178 days.

(21) Appl. No.: 15/105,578

(22) PCT Filed: Jun. 5, 2014

(86) PCT No.: PCT/CN2014/079230
§ 371 (c)(1),
(2) Date: Jul. 11, 2016

(87) PCT Pub. No.: WO2015/090014
PCT Pub. Date: Jun. 25, 2015

(65) Prior Publication Data
US 2016/0323926 A1    Nov. 3, 2016

(30) Foreign Application Priority Data

Dec. 18, 2013 (CN) .......................... 2013 1 0700055

(51) Int. Cl.
*H04W 76/02* (2009.01)
*H04W 28/08* (2009.01)
(Continued)

(52) U.S. Cl.
CPC ............ *H04W 76/15* (2018.02); *H04W 8/082* (2013.01); *H04W 28/08* (2013.01); *H04W 76/10* (2018.02); *H04W 76/12* (2018.02); *H04W 84/045* (2013.01)

(58) Field of Classification Search
None
See application file for complete search history.

(56) References Cited

U.S. PATENT DOCUMENTS

2007/0039025 A1  2/2007  Kraft et al.
2010/0188473 A1  7/2010  King et al.
(Continued)

FOREIGN PATENT DOCUMENTS

CN   103095441 A   5/2013
CN   103139911 A   6/2013
(Continued)

OTHER PUBLICATIONS

3GPP TSG-RAN WG2 #84, Nov. 11-15, 2013, San Francisco, USA. R2-134620. NTT Docomo, Inc. TP to TR 36.842 on SeNB modification and release.
(Continued)

*Primary Examiner* — Candal Elpenord
(74) *Attorney, Agent, or Firm* — Ling Wu; Stephan Yang; Ling and Yang Intellectual Property

(57) ABSTRACT

A method for information interaction under small cell deployment, includes: a master evolved node B adding a candidate secondary evolved node B for a user equipment (S10); the master evolved node B interacting local home network information with the candidate secondary evolved node B via an inter-evolved node B interface (S20); the master evolved node B determining whether to use the candidate secondary evolved node B to provide the user equipment with a dual connectivity service (S30). The
(Continued)

embodiments of the present document can provide a guarantee for selecting a standalone gateway to support a selected Internet Protocol (IP) traffic offload at local network (SIPTO@LN) service aiming at the dual connectivity service feature under small cell deployment. The embodiments of the present document further disclose an evolved node B working under small cell deployment

9 Claims, 7 Drawing Sheets

(51) Int. Cl.
*H04W 8/08* (2009.01)
*H04W 76/15* (2018.01)
*H04W 76/10* (2018.01)
*H04W 76/12* (2018.01)
*H04W 84/04* (2009.01)

(56) References Cited

U.S. PATENT DOCUMENTS

| | | | |
|---|---|---|---|
| 2013/0003697 A1* | 1/2013 | Adjakple | H04W 36/0011 370/331 |
| 2015/0117183 A1* | 4/2015 | Heo | H04W 76/18 370/228 |
| 2015/0124743 A1* | 5/2015 | Damnjanovic | H04L 5/001 370/329 |
| 2016/0014836 A1* | 1/2016 | Pinheiro | H04L 5/0085 370/329 |
| 2016/0249237 A1* | 8/2016 | Won | H04W 60/04 |
| 2017/0171786 A1* | 6/2017 | Mochizuki | H04W 36/0083 |

FOREIGN PATENT DOCUMENTS

| | | |
|---|---|---|
| CN | 103428788 A | 12/2013 |
| WO | 2011153623 A2 | 12/2011 |
| WO | 2012136167 A2 | 10/2012 |

OTHER PUBLICATIONS

SA WG2 Temporary Document; SA WG2 Meeting #86, Jul. 11-15, 2011, Naantali, Finland. Using the LHN id for connected mode mobility procedures. S2-113346.

3GPP TSG-RAN WG2 #84, Nov. 11-15, 2013, San Francisco, USA. R2-134219. Ericsson; Signalling procedures for dual connectivity.

3GPP TSG-RAN WG2 #81bis Chicago, USA, Apr. 15-19, 2013, R2-130984; Discussion on U-plane architecture for dual connectivity; CATT.

3GPP TSG-RAN WG3 #82, Nov. 11-15, 2013, San Francisco, USA. R3-132250; Discussion on Xn Functions and Interface; Qualcomm Incorporated.

3GPP TSG-RAN WG3 #82, Nov. 11-15, 2013, San Francisco, USA. R3-132414; Introduction of SIPO@LN Stand-Alone in S1 AP. Ericsson.

R2-131999; Relevance of LIPA/SIPTO in SCE U-plane architecture discussions; NEC Corporation; 3GPP TSG RAN2 Meeting #82; Fukuoka, Japan, May 20-24, 2013.

R2-133129; Discussion on SeNB local break-out using LIPA and SIPTO@LN; Samsung; 3GPP TSG RAN WG2 Meeting #83Bis; Ljubljana, Slovenia, Oct. 7-11, 2013.

R2-133341; Discussion on detailed C-plane procedures; Nokia Corporation, NSN; 3GPP TSG-RAN WG2 Meeting #83bis; Ljubljana, Slovenia, Oct. 7-11, 2013.

R3-130818; SGW relocation for SIPTO at local network; Alcatel-Lucent; 3GPP TSG-RAN3 Meeting #80; Fukuoka, Japan, May 20-24, 2013.

R3-132102; Handover procedure in case of bearer served by MeNB and SeNB (3C); NSN, Nokia Corporation; 3GPP TSG-RAN WG3 Meeting #82; San Francisco, USA, Nov. 11-Nov. 15, 2013.

* cited by examiner

METHOD FOR CONDUCTING INTERACTION ON INFORMATION IN ENVIRONMENT OF SMALL EVOLVED NODE B, EVOLVED NODE B, AND MOBILITY MANAGEMENT ENTITY

TECHNICAL FIELD

The present document relates to the field of communication technologies, and more particularly, to a method for information interaction under small cell deployment, an evolved node B and a mobile management entity.

BACKGROUND OF THE RELATED ART

As shown in FIG. 1, a Long Term Evolution (LTE) system architecture in the related art comprises: a Mobility Management Entity (MME), a Serving GateWay (SGW) and Evolved Node Bs (eNBs); wherein, an interface between user equipment (UE) and the eNB is a UU interface, an interface between the eNB and the MME is an S1-MME (S1 for the control plane) interface, an interface between the eNB and the SGW is an S1-U interface, and an interface between the eNBs is an X2-U (X2-User plane) or X2-C (X2-Control plane) interface. In LTE, the protocol stack of the S1-MME interface is divided from bottom to up into the following protocol layers: L1 protocol, L2 protocol, Internet Protocol (IP), Stream Control Transmission Protocol (SCTP), S1-Application Protocol (S1-AP). In LTE, the protocol stack of the S1-U interface is divided from bottom to top into the following protocol layers: L1 Protocol, L2 protocol, User Datagram Protocol/Internet Protocol (UDP/IP), GPRS Tunneling Protocol-User plane (GTP-U).

Currently, due to the lack of spectrum resources and the sharp increase of high-traffic services of mobile users, in order to increase the user throughput and enhance the mobility performance, the demand of using a high-frequency point (such as 3.5 GHz) to perform hotspot coverage is increasingly obvious, and using low-power nodes becomes a new application scenario. However, since the signal attenuation at a high-frequency point is relatively serious, the coverage of the new cells is relatively small, and the new cells do not share stations with the existing cells, therefore, if a user moves between these new cells, or moves between the new cells and the existing cells, frequent handover processes are inevitably caused, consequently the user information is frequently transferred between the evolved node Bs, which causes a great signaling impact on the core network, and further restraints the introduction of a large number of small cellular evolved node Bs at the wireless side. As shown in FIG. 2, under small cell deployment architecture, the dual connectivity service of the user plane can reduce the frequent handovers due to the movement of the user equipment. The dual connectivity of the user plane means: user data may be distributed from the core network via the Master eNB (MeNB) to the user, or from the core network via the Secondary evolved node B (SeNB) to the user. Wherein, an interface between the user equipment and the evolved node B is a UU interface, an interface between the MeNB and the MME is an S1-MME interface, an interface between the MeNB, the SeNB and the SGW is an S1-U interface, and an interface between the eNBs is an Xn interface. After the user accesses to the MeNB, the dual connectivity may be implemented by the way of adding, modifying or deleting the SeNB.

On the other hand, along with a wide range of user demands for local services and INTERNET services, for the user equipment (UE) and the core network, a permanent online function needs to be supported (i.e., after a data connectivity is established, the UE may send data to an external data network at any time, while the external data network may also send data to the UE). The external data network refers to an IP network that does not belong to the Public Land Mobile Network (PLMN), but has a connection with the PLMN. For the LIPA@LN (Local IP Access at Local Network) or SIPTO@LN (Selected IP Traffic Offload at Local Network) function, if the gateway supporting the LIPA or SIPTO service is separated from the evolved node B (which may be a macro evolved node B or a home evolved node B), we call the gateway as a standalone GW, and the standalone gateway usually also supports the SGW function. FIG. 3 is a schematic diagram of the architecture of an SIPTO@LN standalone LGW, and under the architecture of the SIPTO@LN standalone LGW, the SGW and the PGW (commonly referred to as LGW) of the UE are located in the wireless-side access network, and are separated from the (H)eNB.

In the relevant LTE system, in order to implement the SIPTO@LN function, under the scenario of a standalone gateway, the concept of local home network is defined, that is, a set of evolved node Bs or home evolved node Bs achieve local IP access to SIPTO@LN via one or more standalone gateways. The LHN ID (Local Home Network ID) is used to uniquely identify the local network in one PLMN. Currently one gateway can only belong to one LHN ID. The evolved node B (which may be a macro evolved node B or a home evolved node B) needs to report the locally supported LHN ID to a core network through a UE-specific message, and the SIPTO service PDN GW (Packet Data Network Gateway) selection is performed by selecting a service standalone gateway according to the LHN ID provided by the evolved node B or the home evolved node B ((H)eNB). Therefore, the (H)eNB needs to carry the LHN ID in an INITIAL UE MESSAGE and an UPLINK NAS TRANSPORT message.

SUMMARY

In the above-mentioned small evolved node B system, for the dual connectivity scenario, due to the introduction of the concepts of MeNB and SeNB, when a user needs to establish a SIPTO@LN, how to provide a guarantee by a network side for supporting the SIPTO@LN is a problem which needs to be solved.

To solve the above-mentioned technical problem, the present document provides a method for information interaction under small cell deployment, an evolved node B and a mobile management entity, which can provide a guarantee for the standalone gateway selection to support the SIPTO@LN aiming at the dual connectivity service feature under small cell deployment.

To solve the above-mentioned technical problem, the present document provides a method for information interaction under small cell deployment, wherein the method comprises:

a master evolved node B adding a candidate secondary evolved node B for a user equipment;

the master evolved node B interacting local home network information with the candidate secondary evolved node B via an inter-evolved node B interface;

the master evolved node B determining whether to use the candidate secondary evolved node B to serve the user equipment with dual connectivity.

Preferably, the method further comprises the following feature:

the local home network information comprises: a local home network ID (LHN ID).

Preferably, the method further comprises the following feature:

the master evolved node B determining whether to use the candidate secondary evolved node B to serve the user equipment with dual connectivity comprises:

if the candidate secondary evolved node B and the master evolved node B belong to a same local home network, then if currently a dual connectivity has been established for the user equipment, taking the candidate secondary evolved node B as a new secondary evolved node B to replace a current secondary evolved node B to serve the user equipment with dual connectivity;

if currently a dual connectivity has not been established for the user equipment, adding the candidate secondary evolved node B as a new secondary evolved node B to serve the user equipment with dual connectivity.

Preferably, the method further comprises the following feature:

the master evolved node B determining whether to use the candidate secondary evolved node B to serve the user equipment with dual connectivity comprises:

if the candidate secondary evolved node B and the master evolved node B belong to different local home networks or the candidate secondary evolved node B does not support a local home network, then if currently a dual connectivity has been established for the user equipment, then changing the user equipment from the dual connectivity to a single connectivity and handing over the user equipment to the candidate secondary evolved node B, or changing the user equipment from the dual connectivity to a single connectivity, and keeping a connectivity with the current master evolved node B unchanged, or keeping the current dual connectivity unchanged;

if currently a dual connectivity has not been established for the user equipment, keeping the current connectivity unchanged.

Preferably, the method further comprises the following feature:

the master evolved node B reporting local home network information of the master evolved node B to a mobile management entity (MME) by an S1 interface message;

wherein, the local home network information is used by a core network to select a standalone gateway to support a selected IP traffic offload at local network (SIPTO@LN).

Preferably, the method further comprises the following feature:

the inter-evolved node B interface is an Xn interface or an X2 interface.

To solve the above-mentioned technical problem, the present document further provides a method for information interaction under small cell deployment, wherein the method comprises:

a mobility management entity re-selecting a serving gateway (SGW) for a user equipment;

the mobility management entity sending an evolved radio access bearer (ERAB) modification message to a master evolved node B to which the user equipment accesses, wherein the ERAB modification message carries new ERAB transport information.

Preferably, the method further comprises the following feature:

a mobility management entity (MME) re-selecting a serving gateway (SGW) for a user equipment comprises:

the mobility management entity (MME) re-selecting a serving gateway (SGW) for the user equipment to newly establish a selected IP traffic offload at local network service or a selected IP traffic offload above radio access network service.

Preferably, the method further comprises the following feature:

the new ERAB transport information comprises: transport layer address information and uplink GTP tunnel endpoint ID (GTP TEID) information.

To solve the above-mentioned technical problem, the present document further provides a method for information interaction under small cell deployment, wherein the method comprises:

a master evolved node B receiving an ERAB modification message carrying new evolved radio access bearer (ERAB) transport information, which is sent by a mobile management entity;

after receiving the ERAB modification message, the master evolved node B forwarding the new ERAB transport information to a secondary evolved node B via an inter-evolved node B interface.

Preferably, the method further comprises the following feature:

the inter-evolved node B interface is an Xn interface or an X2 interface.

To solve the abovementioned technical problem, the present document further provides an evolved node B, wherein the evolved node B works as a master evolved node B under small cell deployment, comprising:

a candidate secondary evolved node B adding module, configured to add a candidate secondary evolved node B for a user equipment;

an inter-evolved node B information interacting module, configured to interact local home network information with the candidate secondary evolved node B via an inter-evolved node B interface;

a secondary evolved node B determining module, configured to determine whether to use the candidate secondary evolved node B to serve the user equipment with dual connectivity.

Preferably, the evolved node B further comprises the following feature:

the local home network information comprises: a local home network ID (LHN ID).

Preferably, the evolved node B further comprises the following feature:

a secondary evolved node B determining module being configured to determine whether to use the candidate secondary evolved node B to serve the user equipment with dual connectivity comprises:

if the candidate secondary evolved node B and the master evolved node B belong to a same local home network, then if currently a dual connectivity has been established for the user equipment, taking the candidate secondary evolved node B as a new secondary evolved node B to replace a current secondary evolved node B to serve the user equipment with dual connectivity;

if currently a dual connectivity has not been established for the user equipment, adding the candidate secondary evolved node B as a new secondary evolved node B to serve the user equipment with dual connectivity.

Preferably, the evolved node B further comprises the following feature:

a secondary evolved node B determining module being configured to determine whether to use the candidate secondary evolved node B to serve the user equipment with dual connectivity comprises:

if the candidate secondary evolved node B and the master evolved node B belong to different local home networks or the candidate secondary evolved node B does not support a local home network, then if currently a dual connectivity has been established for the user equipment, then changing the user equipment from the dual connectivity to a single connectivity and handing over the user equipment to the candidate secondary evolved node B, or changing the user equipment from the dual connectivity to a single connectivity and keeping a connectivity with the current master evolved node B unchanged, or keeping the current dual connectivity unchanged;

if currently a dual connectivity has not been established for the user equipment, keeping the current connectivity unchanged.

Preferably, the evolved node B further comprises a reporting module:

the reporting module is configured to report local home network information of the master evolved node B to a mobile management entity MME by an S1 interface message;

wherein, the local home network information is used by a core network to select a standalone gateway to support a selected IP traffic offload at local network (SIPTO@LN).

To solve the abovementioned technical problem, the present document further provides an evolved node B, wherein the evolved node B works as a master evolved node B under small cell deployment, comprising:

a mobility management entity information receiving module, configured to receive an evolved radio access bearer (ERAB) modification message carrying new ERAB transport information, which is sent by a mobile management entity;

an inter evolved node B information interacting module, configured to after receiving the ERAB modification message, forward the new ERAB transport information to a secondary evolved node B via an inter-evolved node B interface.

Preferably, the evolved node B further comprises the following feature:

the inter-evolved node B interface is an Xn interface or an X2 interface;

the new ERAB transport information comprises: transport layer address information and uplink GTP tunnel endpoint ID (GTP TEID) information.

To solve the abovementioned technical problem, the present document further provides a mobility management entity, comprising:

a gateway selecting module, configured to re-select a serving gateway (SGW) for a user equipment;

a message sending module, configured to send an evolved radio access bearer (ERAB) modification message to a master evolved node B to which the user equipment accesses, wherein the ERAB modification message carries new ERAB transport information.

Preferably, the mobility management entity further comprises the following feature:

the gateway selecting module being configured to re-select a serving gateway (SGW) for a user equipment comprises: re-selecting a serving gateway (SGW) for the user equipment to newly establish a selected IP traffic offload at local network service or a selected IP traffic offload service above radio access network.

Preferably, the mobility management entity further comprises the following feature:

the new ERAB transport information comprises: transport layer address information and uplink GTP tunnel endpoint ID (GTP TEID) information.

Compared with the existing art, the embodiment of the present document provides a method for information interaction, an evolved node B and a mobile management entity under small cell deployment, after adding a candidate secondary evolved node B for a user equipment, the master evolved node B interacts local home network information with the candidate secondary evolved node B, and then determines whether to use the candidate secondary evolved node B to serve the user equipment with dual connectivity based on the information interaction result, and the present document can provide a guarantee for the selection of a standalone gateway to support the SIPTO@LN service aiming at the dual connectivity service feature under small cell deployment. In addition, after the MME re-selects a serving SGW for the user equipment, by sending an ERAB modification message carrying the new ERAB transport information to the master evolved node B to which the user equipment accesses, the master evolved node B forwards the new ERAB transport information to the secondary evolved node B via an inter-evolved node B interface subsequently to guarantee that the SIPTO@LN service is supported aiming at the dual connectivity service feature under small cell deployment.

PREFERRED EMBODIMENTS

Hereinafter, in conjunction with the accompanying drawings, embodiments of the present document will be described in detail. It should be noted that, in the case of no conflict, embodiments and features in the embodiments of the present application may be arbitrarily combined with each other.

Figure 1:
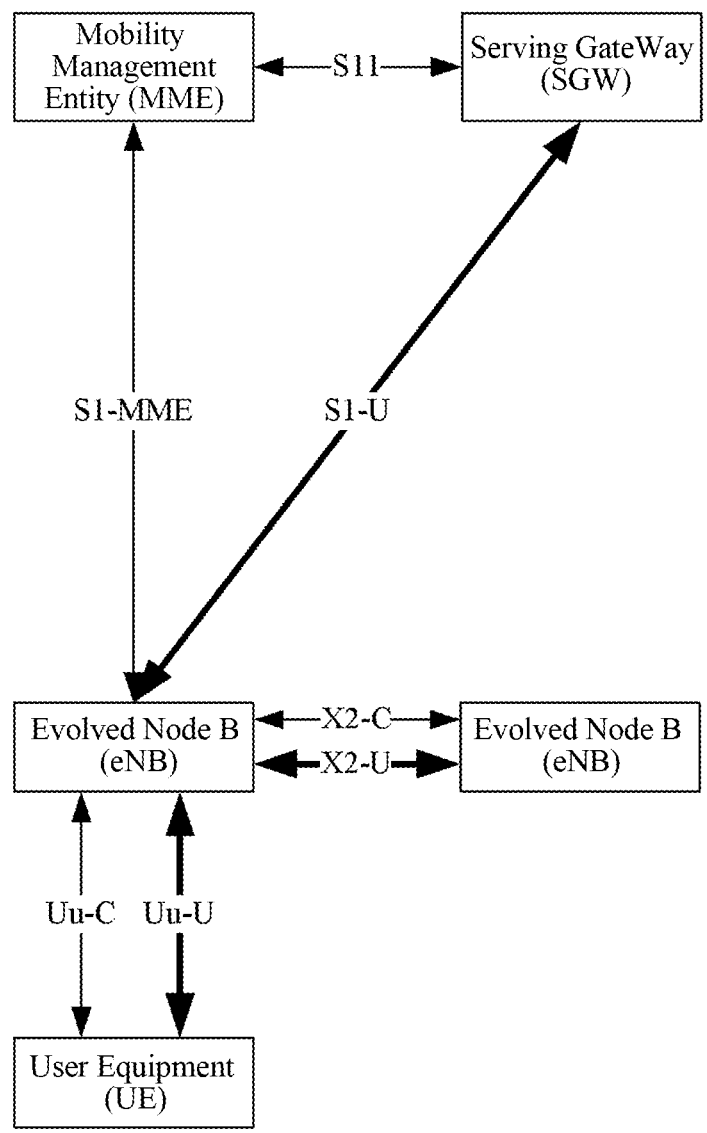
FIG. 1 is a schematic diagram of an overall architecture of LTE in the related art.
Figure 2:
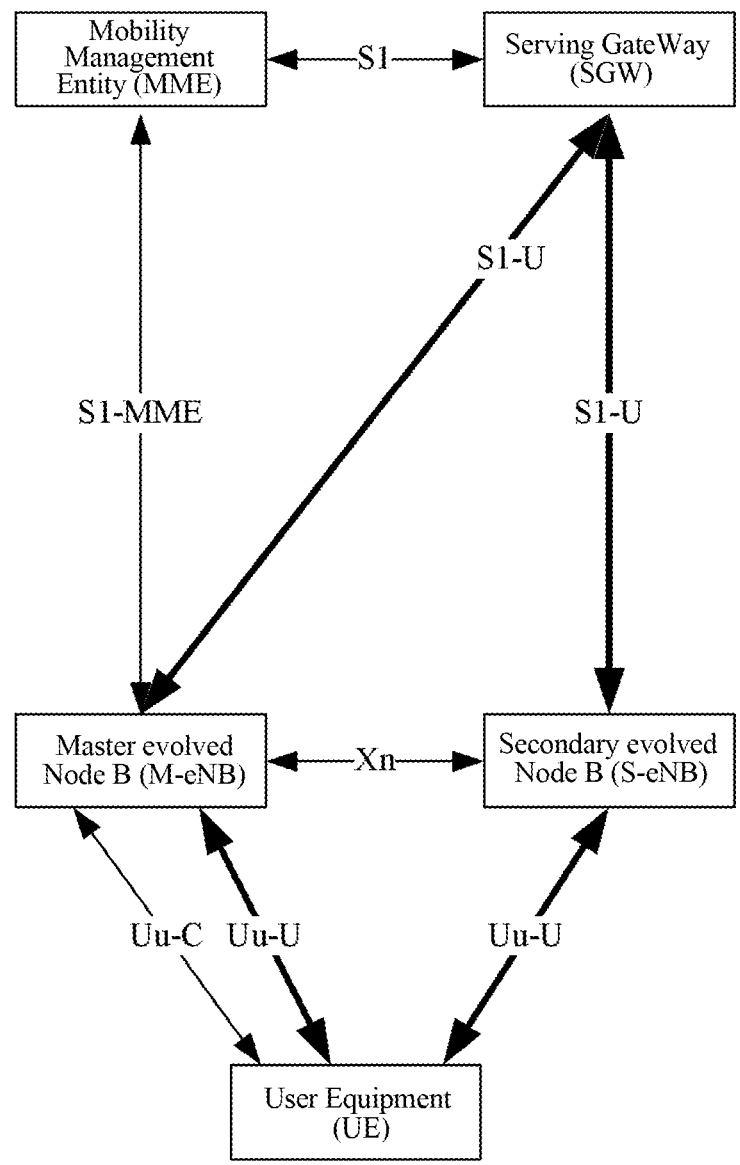
FIG. 2 is a schematic diagram of the architecture of a dual connectivity user plane 1A in the scenario of a small evolved node B in the related art.
Figure 3:
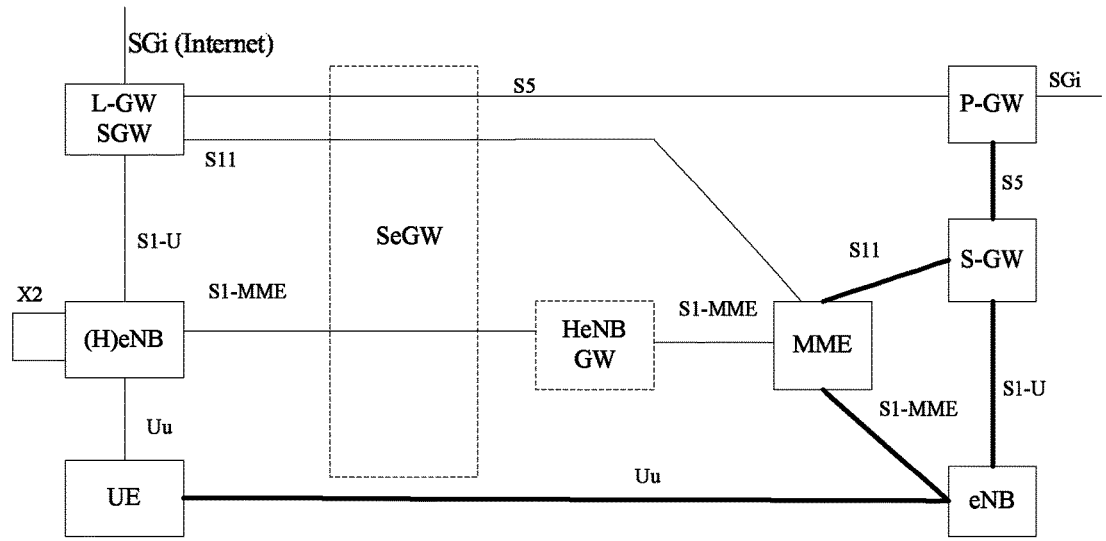
FIG. 3 is a schematic diagram of the architecture supporting SIPTO@LN and with a standalone LGW in the related LTE system.
Figure 4:
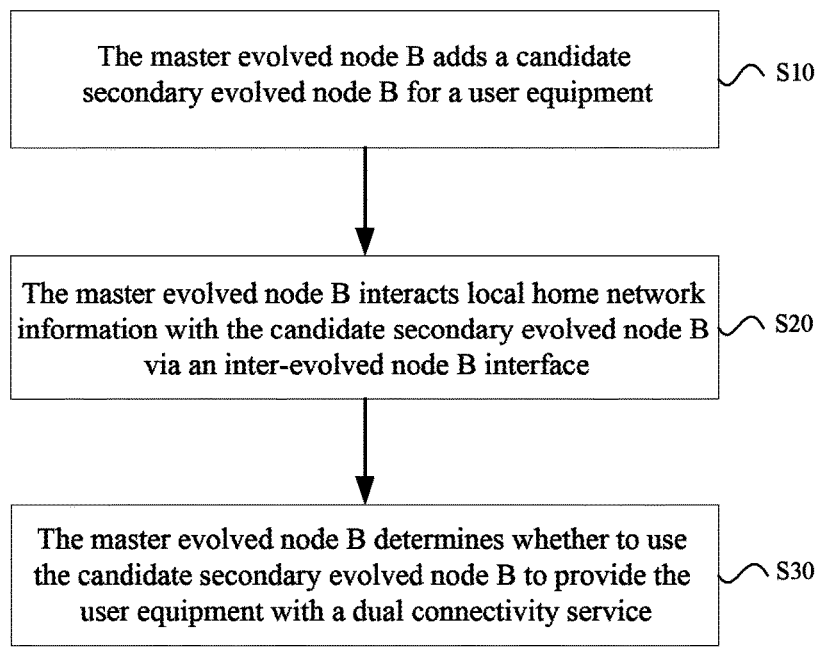
FIG. 4 is a flow chart of a method for information interaction under small cell deployment according to an embodiment of the present document.

As shown in FIG. 4, the embodiment of the present document provides a method for information interaction under small cell deployment, wherein the method comprises:

in S10, the master evolved node B adds a candidate secondary evolved node B for a user equipment;

in S20, the master evolved node B interacts local home network information with the candidate secondary evolved node B via an inter-evolved node B interface;

in S30, the master evolved node B determines whether to use the candidate secondary evolved node B to provide the user equipment with a dual connectivity service.

The method may further comprise the following feature:

wherein, in the step S10, the master evolved node B adding a candidate secondary evolved node B for a user equipment comprises: the master evolved node B receiving a measurement report reported by the user equipment, wherein the measurement report comprises signal quality information of neighboring cells; the master evolved node B determining a neighboring cell whose signal quality meets the requirements, and taking the evolved node B to which the neighboring cell belongs as the candidate secondary evolved node B.

Wherein, before the step S10, the step further comprises:

after detecting that the user equipment accesses to the master evolved node B, the master evolved node B reports the local home network information of the master evolved node B to a mobile management entity MME via an S1 interface message;

wherein, the local home network selection information is used by a core network to select a standalone gateway to support a selected IP traffic offload at local network (SIPTO@LN). That is, after receiving the local home network information of the master evolved node B, the MME saves the information for selecting a corresponding standalone gateway to establish the SIPTO@LN service subsequently.

Wherein the local home network information comprises: a local home network ID (LHN ID).

Preferably, the S1 interface message may be a common S1 interface message, or may be a UE-specific S1 interface message; wherein the common S1 interface message may use one or more of the following: an S1 setup request message, and an evolved node B configuration update message; the UE-specific S1 interface message may use one or more of the following: an INITIAL UE MESSAGE and an UPLINK NAS TRANSPORT message. The S1 interface message is not limited to the above-mentioned S1 interface messages.

Wherein, in the step S20, the inter-evolved node B interface is an Xn interface or an X2 interface;

the Xn interface message may be any one of the following messages: an Xn interface setup message, an evolved node B configuration update message, or a UE-related Xn interface message.

Preferably, in the step S30, the master evolved node B determining whether to use the candidate secondary evolved node B to provide the user equipment with a dual connectivity service comprises:

if the candidate secondary evolved node B and the master evolved node B belong to a same local home network, then if currently a dual connectivity has been established for the user equipment, taking the candidate secondary evolved node B as a new secondary evolved node B to replace the current secondary evolved node B to provide the user equipment with a dual connectivity service;

if currently a dual connectivity has not been established for the user equipment, adding the candidate secondary evolved node B as a new secondary evolved node B to provide the user equipment with a dual connectivity service.

if the candidate secondary evolved node B and the master evolved node B belong to different local home networks or the candidate secondary evolved node B does not support a local home network, then not taking the candidate secondary evolved node B as a new secondary evolved node B to provide the user equipment with a dual connectivity service, comprising:

if currently a dual connectivity has been established for the user equipment, changing the user equipment from the dual connectivity to a single connectivity and handing over the user equipment to the candidate secondary evolved node B, or changing the user equipment from the dual connectivity to a single connectivity, and keeping a connectivity with the current master evolved node B unchanged, or keeping the current dual connectivity unchanged;

if currently a dual connectivity has not been established for the user equipment, keeping the current connectivity unchanged. That is, the master evolved node B waits for subsequently adding a more suitable candidate secondary evolved node B for the user equipment and then establishes a dual connectivity for the user equipment; wherein, the more suitable candidate secondary evolved node B is preferably an evolved node B belonging to the same local home network of the master evolved node B.

That is, if the candidate secondary evolved node B and the master evolved node B belong to different local home networks or the candidate secondary evolved node B does not support a local home network, if the UE is currently in a dual connectivity service, the master evolved node B may consider to change the UE data from the dual connectivity to a single connectivity, and then perform the inter-evolved node B handover, or continue waiting for the UE reporting a new measurement report, and then the master evolved node B adds a new candidate secondary evolved node B for the user equipment, until a new suitable candidate secondary evolved node B (a suitable candidate secondary evolved node B is an evolved node B that has the same local home network ID as the master evolved node B) is found to replace the original secondary evolved node B; if the UE is currently not in the dual connectivity service (in the single connectivity), while the network side (the master evolved node B) considers to establish a dual connectivity service for the UE, when the master evolved node B selects a new secondary evolved node B, one of the consideration factors that the master evolved node B needs to take into account is whether the secondary evolved node B and the master evolved node B support the same local home network, if this candidate secondary evolved node B does not meet the requirement, and the master evolved node B waits for adding a more suitable candidate secondary evolved node B for the user equipment subsequently, and then establishes a dual connectivity for the user equipment.

Preferably, if the master evolved node B adds a secondary evolved node B supporting a different local home network (different from the local home network supported by the master evolved node B) or adds a secondary evolved node B not supporting the local home network, when the master evolved node B reports the local home network information of the master evolved node B via the S1 interface message to the mobile the management entity (MME), the message carries the changed local home network information, such as the information from supporting to not supporting, or from not supporting to supporting, and the correspondingly supported local home network information (LHN ID).

Preferably, in the step S30, after changing the user equipment from the dual connectivity to a single connectivity and handing over the user equipment to the candidate secondary evolved node B, the step further comprises:

the master evolved node B reporting the local home network information of the candidate secondary evolved node B to the core network, and the core network using this information to perform a local gateway service.

Figure 5:
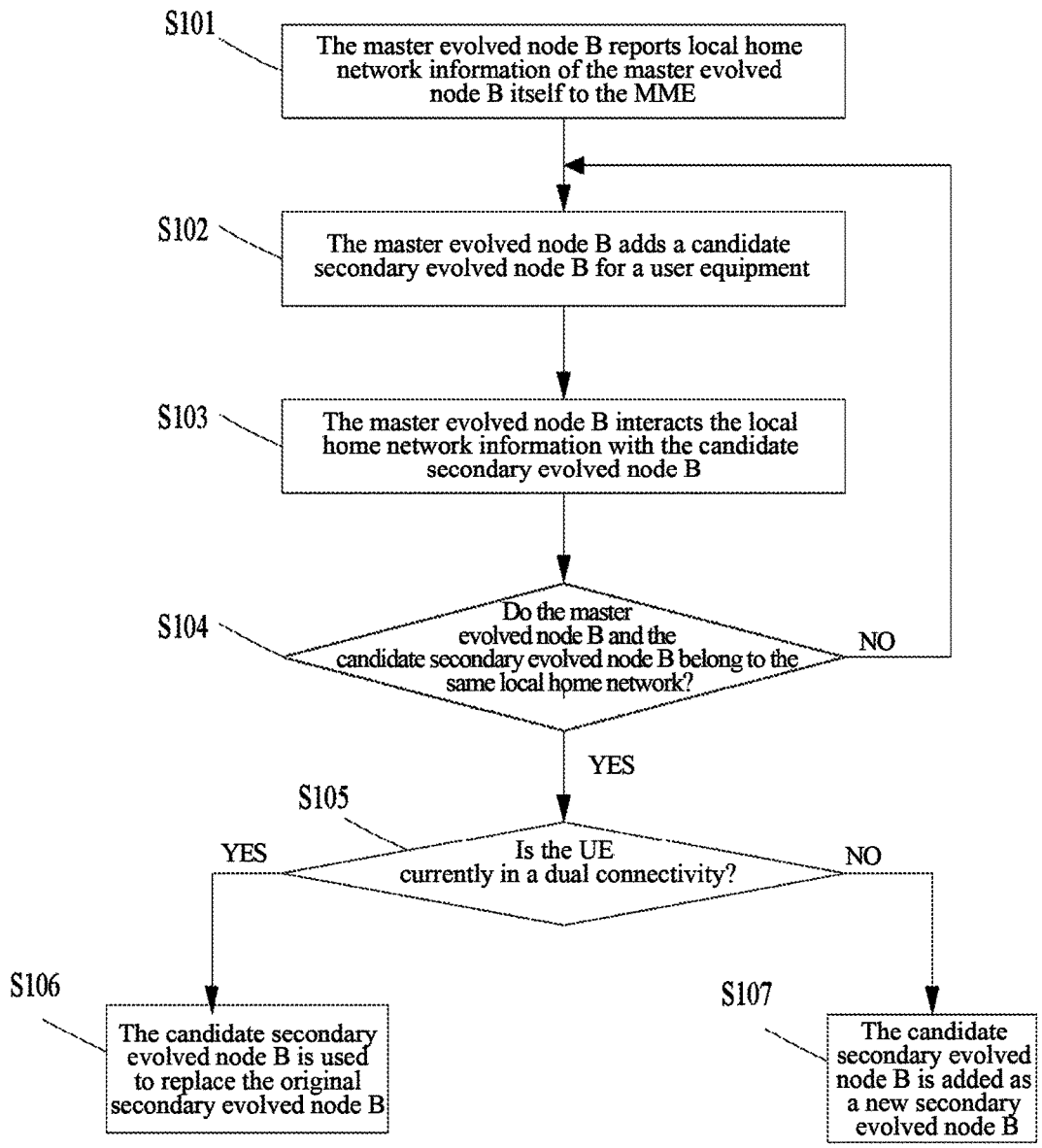
FIG. 5 is a detailed flow chart of the method shown in FIG. 4.

As shown in FIG. 5, the process aiming at the dual connectivity feature and for supporting the SIPTO@LN service in the scenario of a small evolved node B comprises:

In S101, the user equipment accesses to the master evolved node B, and the master evolved node B reports the local home network information of the present evolved node B to the MME via the S1 interface message;

wherein, after receiving the local home network information of the master evolved node B, the MME saves the information for selecting a corresponding standalone gateway to subsequently establish the SIPTO@LN service.

In S102, the master evolved node B adds a candidate secondary evolved node B for the user equipment;

wherein, the master evolved node B receives the measurement report reported by the user equipment, and determines the candidate secondary evolved node B based on the measurement report: if the signal quality of a neighboring cell reported by the user equipment meets the requirements, then takes the evolved node B to which the neighboring cell belongs as the candidate secondary evolved node B.

In S103, the master evolved node B interacts local home network information with the candidate secondary evolved node B via an inter-evolved node B interface message;

wherein, the local home network information comprises the local home network ID (LHN ID). The inter-evolved node B interface is an Xn interface. Wherein, the Xn interface process may be an Xn interface setup process, or an evolved node B configuration update process, or even a UE-related Xn interface message.

In S104, it is to judge whether the master evolved node B and the candidate secondary evolved node B belong to the same local home network, and if yes, step S105 is executed, otherwise it is to return to step S102;

wherein, based on the local home network ID (LHN ID) of the evolved node B, it is to judge whether the two evolved node Bs belong to the same local home network, and if the IDs are the same, the two evolved node Bs belong to the same local home network.

In S105, it is to judge whether the user equipment is currently in the dual connectivity state, and if yes, step S106 is executed, otherwise step S107 is executed.

In S106, it is to determine to change the secondary evolved node B, and use the candidate secondary evolved node B to replace the original secondary evolved node B to provide the user equipment with the dual connectivity service.

In S107, it is to determine to add the secondary evolved node B, and add the candidate secondary evolved node B to provide the user equipment with the dual connectivity service.

Preferably, in the step S104, if it is judged that the master evolved node B and the candidate secondary evolved node B do not belong to the same local home network, for example, the secondary evolved node B belongs to another local home network, or the secondary evolved node B does not support the local home network, it may be further judged whether the user equipment is currently in the dual connectivity state, and if yes, it is to change the user equipment from the dual connectivity to a single connectivity, and then hand over the user equipment to the candidate secondary evolved node B, or change the user equipment from the dual connectivity to a single connectivity and keep a current connectivity with the master evolved node B unchanged.

Figure 6:
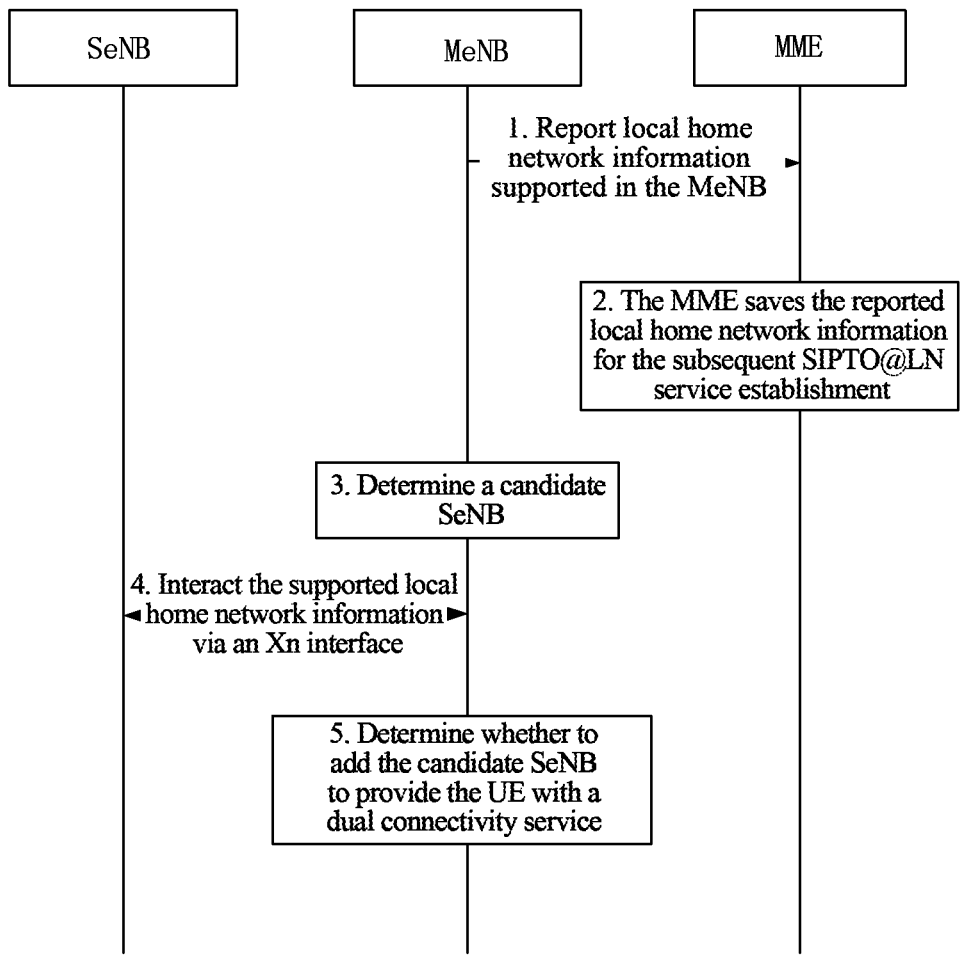
FIG. 6 is a schematic diagram of information interaction between network elements according to the method shown in FIG. 5.

FIG. 6 shows the information interaction process between the MME, the user equipment, the master evolved node B, and the secondary evolved node B, comprising: 1. the master evolved node B reports local home network information supported in the MeNB to the MME; 2. the MME saves the reported local home network information for the subsequent SIPTO@LN service establishment; 3. the master evolved node B determines a candidate SeNB; 4. the master evolved node B interacts the supported local home network information with the candidate secondary evolved node B via the Xn interface; 5. the master evolved node B determines whether to add the candidate SeNB to provide the UE with a dual connectivity service according to the local policy.

Figure 7:
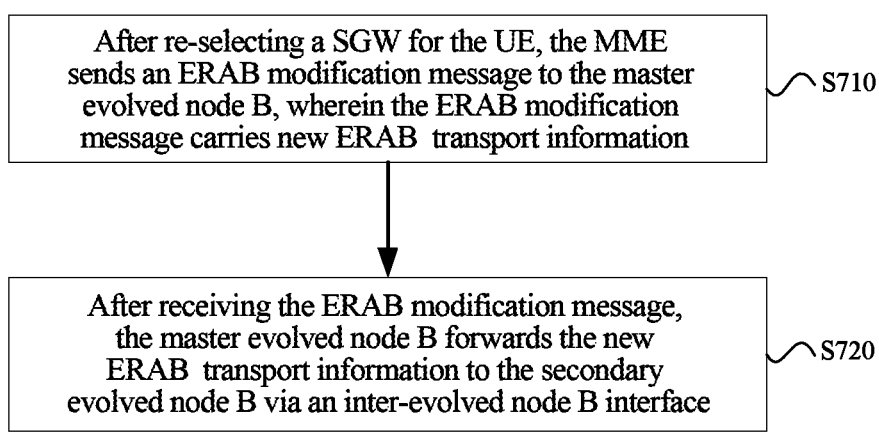
FIG. 7 is a flow chart of another method for information interaction under small cell deployment according to an embodiment of the present document.

As shown in FIG. 7, the embodiment of the present document provides a method for information interaction under small cell deployment, and the method comprises:

in S710, after re-selecting a serving gateway (SGW) for the user equipment, the mobility management entity (MME) sends an evolved radio access bearer (ERAB) modification message to the master evolved node B to which the user equipment accesses, wherein the ERAB modification message carries new ERAB transport information;

in S720, after receiving the ERAB modification message, the master evolved node B forwards the new ERAB transport information to a secondary evolved node B via the inter-evolved node B interface.

The method may further comprise the following feature:

wherein, in step S710, the mobility management entity (MME) re-selecting a serving gateway (SGW) for the user equipment comprises:

the mobility management entity (MME) re-selecting a serving gateway SGW for the user equipment to newly establish a selected IP traffic offload at local network (SIPTO@LN) service or a selected IP traffic offload above radio access network (SIPTO above RAN) service (for example, the original serving gateway does not support the local home network).

Wherein, the evolved radio access bearer (ERAB) transport information comprises the transport layer address information and the uplink GPRS Tunnel Protocol Tunnel Endpoint ID (GTP TEID) information.

Preferably, in the step S720, the inter-evolved node B interface is an X2 interface or an Xn interface.

Wherein, the Xn interface message may be a message obtained by modifying an existing Xn interface message, and may also be a new independent Xn interface message; the new ERAB transport information comprises the transport layer address information and the uplink GTP TEID information;

wherein, after receiving the above-mentioned ERAB modification message, the secondary evolved node B can learns that the SGW address has been changed, and subsequently transports data via the new SGW.

Figure 8:
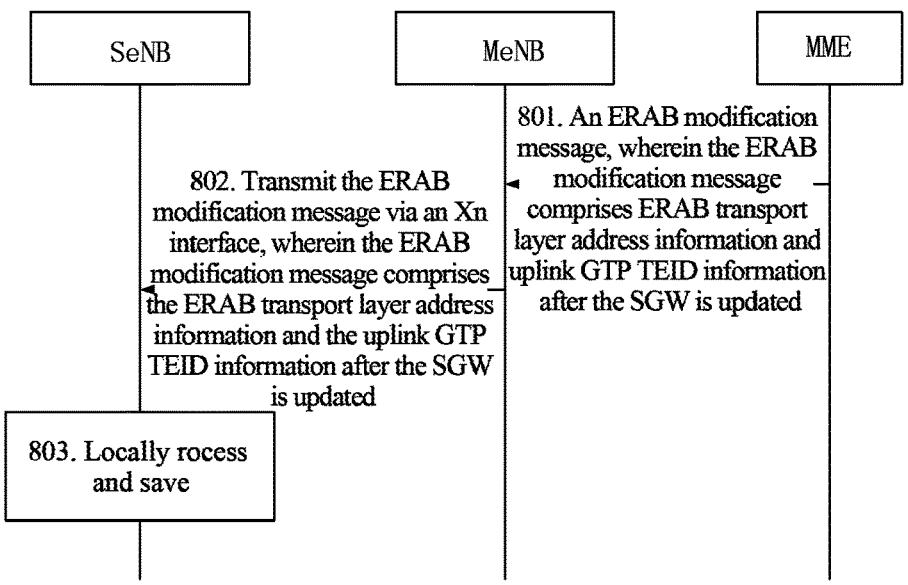
FIG. 8 is a schematic diagram of information interaction between network elements according to the method shown in FIG. 7.

FIG. 8 shows an information interaction process between the MME, the user equipment, the master evolved node B and the secondary evolved node B, comprising: In 801, the MME sends an ERAB modification message to the master evolved node B, wherein the ERAB modification message comprises the ERAB transport layer address information and the uplink GTP TEID information after the SGW is updated. In 802, the master evolved node B forwards the new ERAB transport information to the secondary evolved node B via the inter-evolved node B interface, wherein the message comprises the ERAB transport layer address information and the uplink GTP TEID information after the SGW is updated. In 803, the secondary evolved node B locally processes and saves the ERAB transport layer address information and the uplink GTP TEID information after the SGW is updated.

Figure 9:
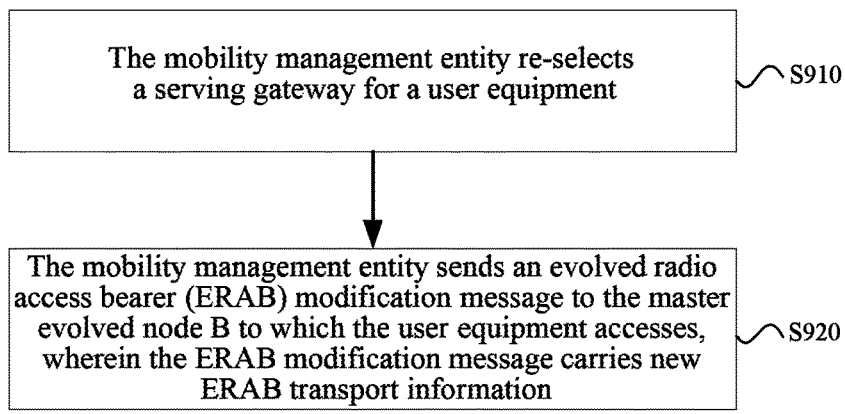
FIG. 9 is a flow chart of another method (for MME) for information interaction under small cell deployment according to an embodiment of the present document.

As shown in FIG. 9, the embodiment of the present document provides a method for information interaction under small cell deployment, and the method comprises:

in S910, the mobility management entity re-selects a serving gateway (SGW) for the user equipment;

in S920, the mobility management entity sends an evolved radio access bearer (ERAB) modification message to the master evolved node B to which the user equipment accesses, wherein the ERAB modification message carries the new ERAB transport information.

The method may further comprise the following feature:

wherein, the mobility management entity (MME) re-selecting a serving gateway (SGW) for the user equipment comprises:

the mobility management entity (MME) re-selecting the serving gateway (SGW) for the user equipment to newly establish a selected IP traffic offload at local network (SIPTO@LN) service or selected IP traffic offload above radio access network service.

wherein, the new ERAB transport information comprises: the transport layer address information and the uplink GTP tunnel endpoint ID (GTP TEID) information.

Figure 10:
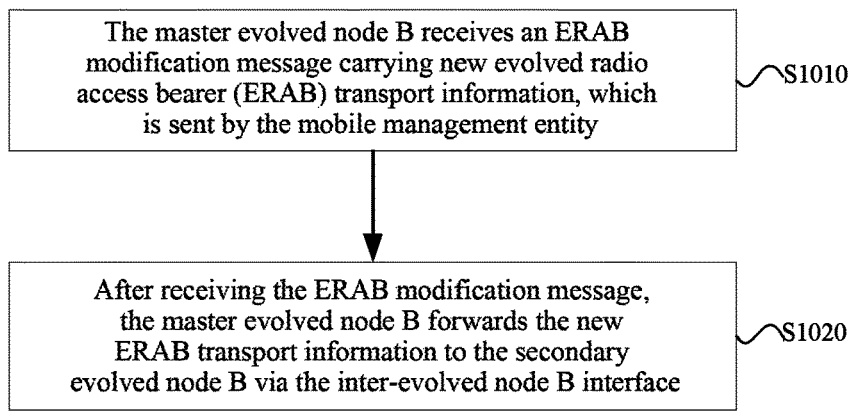
FIG. 10 is a flow chart of another method (for a master evolved node B) for information interaction under small cell deployment according to an embodiment of the present document.

As shown in FIG. 10, the embodiment of the present document provides a method for information interaction under small cell deployment, wherein the method comprises:

in S1010, the master evolved node B receives the ERAB modification message carrying the new evolved radio access bearer (ERAB) transport information, which is sent by the mobile management entity;

in S1020, after receiving the ERAB modification message, the master evolved node B forwards the new ERAB transport information to the secondary evolved node B via the inter-evolved node B interface.

The method may further comprise the following feature:

wherein, the inter-evolved node B interface is an X2 interface or an Xn interface.

Figure 11:
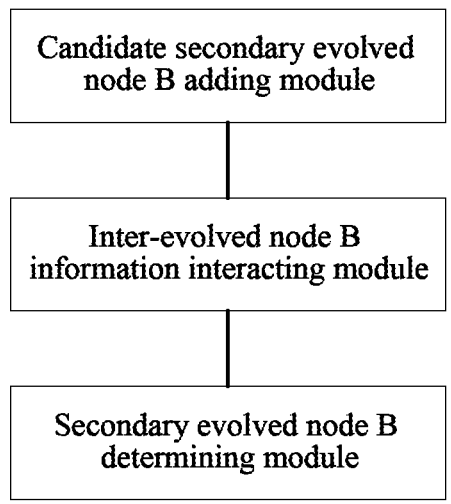
FIG. 11 is a schematic diagram of a structure of a master evolved node B under small cell deployment according to an embodiment of the present document.

As shown in FIG. 11, the embodiment of the present document provides an evolved node B, wherein the evolved node B works as a master evolved node B under small cell deployment, comprising:

a candidate secondary evolved node B adding module, configured to add a candidate secondary evolved node B for the user equipment;

an inter evolved node B information interacting module, configured to interact local home network information with the candidate secondary evolved node B via an inter-evolved node B interface;

a secondary evolved node B determining module, configured to determine whether to use the candidate secondary evolved node B to provide the user equipment with a dual connectivity service.

The master evolved node B may further comprise the following feature:

preferably, the local home network information comprises a local home network ID (LHN ID);

a secondary evolved node B determining module being configured to determine whether to use the candidate secondary evolved node B to provide the user equipment with a dual connectivity service, comprises:

if the candidate secondary evolved node B and the master evolved node B belong to a same local home network, then if currently a dual connectivity has been established for the user equipment, taking the candidate secondary evolved node B as a new secondary evolved node B to replace the current secondary evolved node B to provide the user equipment with a dual connectivity service;

if currently a dual connectivity has not been established for the user equipment, then adding the candidate secondary evolved node B as a new secondary evolved node B to provide the user equipment with a dual connectivity service;

if the candidate secondary evolved node B and the master evolved node B belong to different local home networks or the candidate secondary evolved node B does not support a local home network, not determining the candidate secondary evolved node B as the new secondary evolved node B to provide the user equipment with the dual connectivity service, comprising:

if currently a dual connectivity has been established for the user equipment, then changing the user equipment from the dual connectivity to a single connectivity and handing over the user equipment to the candidate secondary evolved node B, or changing the user equipment from the dual connectivity to a single connectivity, and keeping a current connectivity with the master evolved node B unchanged, or keeping the current dual connectivity unchanged;

if currently a dual connectivity has not been established for the user equipment, keeping the current connectivity unchanged.

Preferably, the master evolved node B further comprises a reporting module:

the reporting module is used to report local home network information of the master evolved node B to the mobile management entity (MME) via an S1 interface message;

wherein, the local home network information is used by the core network to select a standalone gateway to support the selected IP traffic offload at local network (SIPTO@LN).

Preferably, the inter-evolved node B interface is an Xn interface or an X2 interface.

Figure 12:
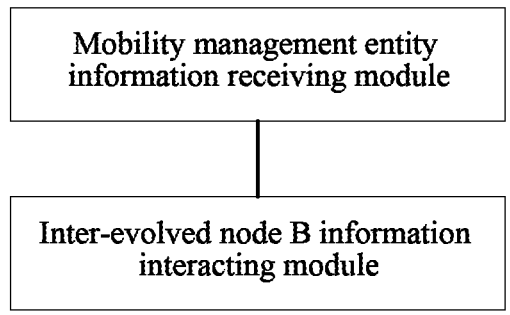
FIG. 12 is a schematic diagram of another structure of a master evolved node B under small cell deployment according to an embodiment of the present document.

As shown in FIG. 12, the embodiment of the present document provides an evolved node B, wherein the evolved node B works as a master evolved node B under small cell deployment, comprising:

a mobility management entity information receiving module, used to receive an ERAB modification message carrying new Evolved Radio Access Bearer (ERAB) transport information, which is sent by the mobile management entity;

an inter-evolved node B information interacting module, used to, after receiving the ERAB modification message, forward the new ERAB transport information to the secondary evolved node B via an inter-evolved node B interface.

The master evolved node B may further comprise the following feature:

preferably, the inter-evolved node s interface is an Xn interface or an X2 interface;

preferably, the ERAB transport information comprises transport layer address information and uplink GPRS tunnel protocol tunnel endpoint ID (GTP TEID) information.

Figure 13:
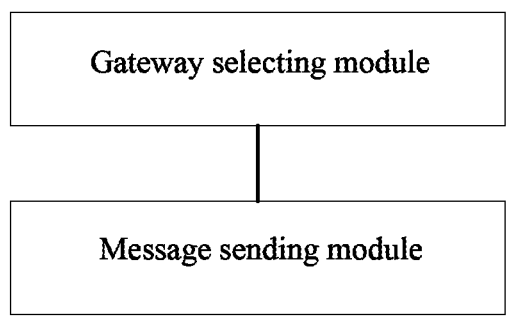
FIG. 13 is a schematic diagram of a structure of a mobility management entity according to an embodiment of the present document.

As shown in FIG. 13, the embodiment of the present document provides a mobility management entity, comprising:

a gateway selecting module, used to re-select a serving gateway (SGW) for a user equipment;

a message sending module, used to send an evolved radio access bearer (ERAB) modification message to the master evolved node B to which the user equipment accesses, wherein the ERAB modification message carries new ERAB transport information.

The mobility management entity may further comprise the following feature:

preferably, the gateway selecting module being used to re-select a serving gateway (SGW) for a user equipment, comprises: re-selecting the serving gateway (SGW) for the user equipment to newly establish a selected IP traffic offload at local network service or selected IP traffic offload service above radio access network.

Preferably, the new ERAB transport information comprises: transport layer address information and uplink GTP tunnel endpoint ID (GTP TEID) information.

Those ordinarily skilled in the art can understand that all or some of steps of the above-mentioned method may be completed by the programs instructing the relevant hardware, and the programs may be stored in a computer-readable storage medium, such as read only memory, magnetic or optical disk. Alternatively, all or some of the steps of the above-mentioned embodiments may also be implemented by using one or more integrated circuits. Accordingly, each module/unit in the above-mentioned embodiments may be realized in a form of hardware, or in a form of software function modules. The present document is not limited to any specific form of hardware and software combinations.

It should be noted that the present document may further have a variety of other embodiments, and without departing from the rule and essence of the present document, those skilled in the art can make various appropriate changes and modifications according to the present document, and these appropriate changes and modifications should fall within the protection scope of the appended claims of the present document.

INDUSTRIAL APPLICABILITY

The embodiment of the present document provides a method for information interaction under small cell deployment, an evolved node B and a mobile management entity, after adding a candidate secondary evolved node B for a user equipment, the master evolved node B interacts local home network information with the candidate secondary evolved node B, and determines whether to use the candidate secondary evolved node B to provide the user equipment with a dual connectivity service based on the information interaction result, and the present document can provide a guarantee for the selection of a standalone gateway to support the SIPTO@LN service aiming at the dual connectivity service feature under small cell deployment. In addition, after the MME re-selects a serving SGW for the user equipment, by sending an ERAB modification message carrying the new ERAB transport information to the master evolved node B to which the user equipment accesses, then the master evolved node B forwards the new ERAB transport information to the secondary evolved node B via an inter-evolved node B interface subsequently, to guarantee that the SIPTO@LN service is supported aiming at the dual connectivity service feature under small cell deployment.

What is claimed is:

1. A method for information interaction under small cell deployment, comprising:
    a master evolved node B adding a candidate secondary evolved node B for a user equipment;
    the master evolved node B interacting local home network information with the candidate secondary evolved node B via an inter-evolved node B interface;
    the master evolved node B determining whether to use the candidate secondary evolved node B to serve the user equipment with dual connectivity based on the determination of whether the candidate secondary evolved node B and the master evolved node B belong to a same local home network; wherein,
    the local home network information comprises: a local home network ID.

2. The method of claim 1, wherein,
    the master evolved node B determining whether to use the candidate secondary evolved node B to serve the user equipment with dual connectivity comprises:
    if the candidate secondary evolved node B and the master evolved node B belong to the same local home network, then
    if currently a dual connectivity has been established for the user equipment, taking the candidate secondary evolved node B as a new secondary evolved node B to replace a current secondary evolved node B to serve the user equipment with dual connectivity;
    if currently a dual connectivity has not been established for the user equipment, adding the candidate secondary evolved node B as a new secondary evolved node B to serve the user equipment with dual connectivity.

3. The method of claim 2, wherein,
    the master evolved node B determining whether to use the candidate secondary evolved node B to serve the user equipment with dual connectivity comprises:
    if the candidate secondary evolved node B and the master evolved node B belong to different local home networks or the candidate secondary evolved node B does not support a local home network, then
    if currently a dual connectivity has been established for the user equipment, then changing the user equipment from the dual connectivity to a single connectivity and handing over the user equipment to the candidate secondary evolved node B, or changing the user equipment from the dual connectivity to a single connectivity and keeping a connectivity with the current master evolved node B unchanged, or keeping the current dual connectivity unchanged;
    if currently a dual connectivity has not been established for the user equipment, keeping the current connectivity unchanged.

4. The method of claim 1, further comprising,
    the master evolved node B reporting local home network information of the master evolved node B to a mobile management entity by an S1 interface message;

wherein, the local home network information is used by a core network to select a standalone gateway to support a selected IP traffic offload at local network (SIPTO@LN).

5. The method of claim 1, further comprising:
the inter-evolved node B interface is an Xn interface or an X2 interface.

6. An evolved node B, wherein the evolved node B works as a master evolved node B under small cell deployment, comprising hardware performing instructions stored in a non-transitory computer readable medium which executes steps in following modules:
   a candidate secondary evolved node B adding module, configured to add a candidate secondary evolved node B for a user equipment;
   an inter-evolved node B information interacting module, configured to interact local home network information with the candidate secondary evolved node B via an inter-evolved node B interface;
   a secondary evolved node B determining module, configured to determine whether to use the candidate secondary evolved node B to serve the user equipment with dual connectivity based on the determination of whether the candidate secondary evolved node B and the master evolved node B belong to a same local home network; wherein,
   the local home network information comprises: a local home network ID.

7. The evolved node B of claim 6, wherein,
a secondary evolved node B determining module being configured to determine whether to use the candidate secondary evolved node B to serve the user equipment with dual connectivity comprises:
if the candidate secondary evolved node B and the master evolved node B belong to the same local home network, then
if currently a dual connectivity has been established for the user equipment, taking the candidate secondary evolved node B as a new secondary evolved node B to replace a current secondary evolved node B to serve the user equipment with dual connectivity;
if currently a dual connectivity has not been established for the user equipment, adding the candidate secondary evolved node B as a new secondary evolved node B to serve the user equipment with dual connectivity.

8. The evolved node B of claim 7, wherein,
a secondary evolved node B determining module being configured to determine whether to use the candidate secondary evolved node B to serve the user equipment with dual connectivity comprises:
if the candidate secondary evolved node B and the master evolved node B belong to different local home networks or the candidate secondary evolved node B does not support a local home network, then
if currently a dual connectivity has been established for the user equipment, then changing the user equipment from the dual connectivity to a single connectivity and handing over the user equipment to the candidate secondary evolved node B, or changing the user equipment from the dual connectivity to a single connectivity and keeping a connectivity with the current master evolved node B unchanged, or keeping the current dual connectivity unchanged;
if currently a dual connectivity has not been established for the user equipment, keeping the current connectivity unchanged.

9. The evolved node B of claim 6, further comprising a reporting module, wherein
the reporting module is configured to report local home network information of the master evolved node B to a mobile management entity by an S1 interface message;
wherein, the local home network information is used by a core network to select a standalone gateway to support a selected IP traffic offload at local network (SIPTO@LN).

* * * * *